(12) United States Patent
Kania et al.

(10) Patent No.: US 8,143,348 B2
(45) Date of Patent: Mar. 27, 2012

(54) WATERBORNE COATING COMPOSITIONS, RELATED METHODS AND COATED SUBSTRATES

(75) Inventors: Charles M. Kania, Natrona Heights, PA (US); Irina G. Schwendeman, Wexford, PA (US); Venkateshwarlu Kalsani, Allison Park, PA (US); Richard J. Winters, Freeport, PA (US); Michael Ziegler, Cranberry Township, PA (US); Manfred Wunsch, Pittsburgh, PA (US); Carole A. Conley, Verona, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 139 days.

(21) Appl. No.: 12/630,276

(22) Filed: Dec. 3, 2009

(65) Prior Publication Data

US 2011/0054113 A1    Mar. 3, 2011

Related U.S. Application Data

(60) Provisional application No. 61/238,911, filed on Sep. 1, 2009.

(51) Int. Cl.
*C09D 133/06* (2006.01)
*C09D 5/02* (2006.01)
*C08F 220/14* (2006.01)

(52) U.S. Cl. .......... 525/55; 526/201; 526/309; 526/330; 526/331; 523/201

(58) Field of Classification Search .................. 526/309, 526/330, 331, 201; 523/201; 525/55
See application file for complete search history.

(56) References Cited

U.S. PATENT DOCUMENTS

| | | | |
|---|---|---|---|
| 4,220,679 A | 9/1980 | Backhouse | |
| 4,290,932 A | 9/1981 | Wright | |
| 4,539,348 A | 9/1985 | Gajria | |
| 4,563,372 A | 1/1986 | Kurauchi | |
| 4,567,246 A | 1/1986 | Gajria | |
| 4,594,363 A | 6/1986 | Blankenship | |
| 4,611,028 A | 9/1986 | Peng | |
| 4,639,394 A | 1/1987 | Das | |
| 4,705,821 A | 11/1987 | Ito | |
| 4,728,543 A | 3/1988 | Kurauchi | |
| 4,728,545 A | 3/1988 | Kurauchi | |
| 4,749,506 A | 6/1988 | Kitahara | |
| 4,777,213 A | 10/1988 | Kanda | |
| 4,897,434 A | 1/1990 | Shimada | |
| 4,920,160 A | 4/1990 | Chip | |
| 4,939,189 A | 7/1990 | Tobinaga | |
| 4,968,435 A | 11/1990 | Neff | |
| 5,071,904 A | 12/1991 | Martin | |
| 5,212,273 A | 5/1993 | Das | |
| 5,292,797 A | 3/1994 | Göldner | |
| 5,331,025 A | 7/1994 | Lavoie | |
| 5,340,865 A | 8/1994 | Neff | |
| 5,362,772 A | 11/1994 | Uhlianuk | |
| 5,494,954 A | 2/1996 | Das | |
| 5,508,325 A | 4/1996 | Craun | |
| 5,554,671 A | 9/1996 | Craun | |
| 5,565,504 A | 10/1996 | Dannhorn | |
| 5,576,361 A | 11/1996 | Craun | |
| 5,663,240 A | 9/1997 | Simeone | |
| 5,667,847 A | 9/1997 | Muller | |
| 5,705,559 A | 1/1998 | Sakamoto | |
| 5,830,928 A | 11/1998 | Faler | |
| 5,977,258 A | 11/1999 | Hille | |
| 5,994,492 A | 11/1999 | Graham | |
| 6,180,181 B1 | 1/2001 | Verardi | |
| 6,291,564 B1 | 9/2001 | Faler | |
| 6,329,060 B1 | 12/2001 | Barkac | |
| 6,509,128 B1 * | 1/2003 | Everaerts et al. ............... 430/39 |
| 6,531,541 B1 | 3/2003 | Desai | |
| 6,586,097 B1 | 7/2003 | Pascault | |
| 6,762,240 B2 | 7/2004 | Swarup | |
| 7,001,952 B2 | 2/2006 | Faler | |
| 7,091,275 B1 | 8/2006 | Amick | |
| 2007/0179240 A1 | 8/2007 | Chalmers | |

FOREIGN PATENT DOCUMENTS

| | | |
|---|---|---|
| EP | 1944344 A1 | 7/2008 |
| GB | 967051 | 8/1964 |
| JP | 2000313720 | 11/2000 |
| JP | 2000313720 A * | 11/2000 |
| JP | 2004263024 A * | 9/2004 |

OTHER PUBLICATIONS

XP002616980, Database WPI, Week 200109, Thomson Scientific, London, GB, AN1001-075006.

* cited by examiner

*Primary Examiner* — Kelechi Egwim
(74) *Attorney, Agent, or Firm* — Donald R. Palladino

(57) ABSTRACT

Disclosed are coating compositions that include a continuous phase that includes water and a dispersed phase that includes a microgel having a mean particle size of greater than 50 nanometers. The microgel is formed from reactants selected so as to provide a copolymer having a certain calculated Tg and includes a cycloaliphatic (meth)acrylate.

19 Claims, No Drawings

WATERBORNE COATING COMPOSITIONS, RELATED METHODS AND COATED SUBSTRATES

CROSS-REFERENCE TO RELATED APPLICATION(S)

This application claims priority to and the benefit of U.S. Provisional Application Ser. No. 61/238,911, filed Sep. 1, 2009, the entire content of which being incorporated herein by reference.

FIELD OF THE INVENTION

The present invention relates to coating compositions. More particularly, the present invention relates to waterborne coating compositions. The present invention also relates to methods for using such compositions and substrates coated with a coating deposited from such compositions.

BACKGROUND INFORMATION

Coating compositions in which all of the components are stored together in a single container, often known as 1-K compositions, are desirable in many cases from the standpoint of, for example, convenience to the end user. Among the properties that such coating compositions should exhibit is storage stability. In other words, the viscosity of the composition should not significantly increase over time to the point in which the composition is no longer suitable for convenient use for depositing a coating.

In many cases, it is desirable to use liquid coating compositions that are borne in water as opposed to organic solvents. This desire often stems primarily from environmental concerns with the emission of volatile organic compounds (VOC) during the painting process.

In some cases, such as when a coating composition is to be applied to an article that is often handled by a person, such as a consumer electronics device, including laptop computers, personal data assistants, cellular telephones, and the like, it is important that the composition produce a coating that is particularly resistant to certain oils and acids, such as oleic acid, that simulate human sweat. In addition, it is important that such coatings be particularly resistant to alcohols, solvents and abrasion, as well as being capable of an aesthetically pleasing high gloss appearance, including the absence of "spotting", when applied using any of a variety of spray application equipment and conditions.

The present invention was made in view of the foregoing.

SUMMARY OF THE INVENTION

In certain respects, the present invention is directed to coating compositions, such as 1-K, waterborne coating compositions. These coating compositions comprise a continuous phase and a dispersed phase. The continuous phase comprises water. The dispersed phase comprises a microgel having a mean particle size of greater than 50 nanometers. The microgel is formed from reactants comprising or, in some cases, consisting essentially of: (i) no more than 5 percent by weight, based on the total weight of the reactants, of a multiethylenically unsaturated compound, and (ii) a plurality of monoethylenically unsaturated compounds selected so as to provide a copolymer having a calculated Tg greater than 100° C. and comprising a cycloaliphatic (meth)acrylate.

In other respects, the present invention is directed to waterborne coating compositions comprising a continuous phase and a dispersed phase. The continuous phase comprises water. The dispersed phase comprises a microgel. The microgel comprises the reaction product of reactants comprising or, in some cases, consisting essentially of: (i) a multiethylenically unsaturated compound, and (ii) a plurality of monoethylenically unsaturated compounds selected so as to provide a copolymer having a calculated Tg greater than 100° C. and comprising a cycloaliphatic (meth)acrylate. In addition, the microgel has a mean particle size of greater than 50 nanometers and is present in the coating composition in an amount of at least 50 percent by weight, based on the total weight of resin solids in the composition.

The present invention is also related to, inter alia, methods for using such coating compositions and substrates at least partially coated with a coating deposited from such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to coating compositions, such as 1-K, waterborne coating compositions. As used herein, the term "1-K" refers to coating compositions in which all of the composition components are stored together in a single container and which are storage stable, which means that the viscosity of the composition does not significantly increase over time to the point in which the composition is no longer suitable for convenient use for depositing a coating. In fact, in certain embodiments, the coating compositions are storage stable, when stored in a sealed container at 140° F., for up to a period of 1 year.

As used herein, the term "waterborne" refers to coating compositions in which the solvent or carrier fluid, i.e., the continuous phase, for the coating composition primarily or principally comprises water. For example, in certain embodiments, the continuous phase is at least 70, in some cases, at least 80 weight percent water, based on the total weight of the continuous phase. Moreover, certain of the coating compositions of the present invention are "low VOC coating compositions". As used herein, the term "low VOC composition" means that the composition contains no more than five (5) pounds of volatile organic compounds per gallon of the coating composition. As used herein, the term "volatile organic compound" refers to compounds that have at least one carbon atom and which are released from the composition during drying and/or curing thereof. Examples of "volatile organic compounds" which are suitable for use in the present invention include, but are not limited to, alcohols, benzenes, toluenes, chloroforms, and cyclohexanes. One specific example of a suitable volatile organic compound is diethylene glycol monoethyl ether.

As previously indicated, the coating compositions of the present invention comprise a dispersed phase comprising a microgel. As used herein, and as will be appreciated by those skilled in the art, the term "microgel" refers to gelled, i.e., internally crosslinked, polymer particles which generally have a diameter in the micrometer range or less. The microgel particles present in the coating compositions of the present invention are often generally uniform, i.e., not core-shell.

In certain embodiments of the present invention, the microgel has a size that is uniformly small, i.e., after polymerization less than 20 percent of the microgel particles have a particle size of greater than 5 micron, or, in some cases, greater than 1 micron. In certain embodiments, the microgel has a mean particle size of no more than 1 micron, such as no more than 900 nanometers, no more than 800 nanometers, no more than 500 nanometers, no more than 400 nanometers, or, in some cases, no more than 350 nanometers. Moreover, in certain embodiments, the microgel has a mean particle size of at least 1 nanometer, such as greater than 5 nanometers, greater than 10 nanometers, greater than 50 nanometers, or, in some cases, greater than 100 nanometers. The microgel particle diameter can be measured by photon correlation spectroscopy as described in International Standard ISO 13321. The average particle diameter values reported herein are measured by photon correlation spectroscopy using a Malvern Zetasizer 3000HSa according to the following procedure. Approximately 10 mL of ultra filtered deionized water and 1 drop of a homogenous test sample are added to a clean 20 mL vial and then mixed. A cuvet is cleaned and filled with ultrafiltered deionized water, to which about 3-6 drops of the diluted sample is added. Once any air bubbles are removed, the cuvet is placed in the Zetasizer 3000HSa to determine if the sample is of the correct concentration using the Correlator Control window in the Zetasizer Software (100 to 200 KCts/sec). Particle size measurements are then made with the Zetasizer 3000HSa.

In certain embodiments, the microgel is the predominant, or, in some cases, essentially the sole source of resin solids in the coating compositions of the present invention. As a result, in certain embodiments, the microgel is present in the coating compositions of the present invention in an amount of at least 50 percent by weight, such as at least 70 percent by weight, at least 80 percent by weight, at least 90 percent by weight, or, in some cases, at least 92 percent by weight, based on the total weight of resin solids in the coating composition. In fact, it was surprisingly discovered that the relatively high Tg microgels described herein, even when used as essentially the sole source of resin solids in the present coating compositions, can coalesce to form a cured film having a pleasing high gloss appearance without "spotting" (even when applied using a variety of spray application equipment and conditions) and surprisingly good chemical and stain resistance, such as ethanol, isopropanol, lactic acid, oleic acid and MEK resistance.

In certain embodiments, the coating compositions of the present invention are substantially, or, in some cases, completely free of any other polymer particles, such as polymer particles having a mean diameter in the range of from 1 to 50 nanometers. In this context, "essentially free" means that the other polymer particles are present in the composition in an amount of less than 1 percent by weight, such as no more than 0.5 percent by weight or no more than 0.1 percent by weight, based on the total weight of resin solids in the coating composition. "Completely free" means that other polymer particles are not present in the composition at all.

The microgel present in the coating compositions of the present invention is formed from reactants comprising a multiethylenically unsaturated compound. As used herein, the term "multiethylenically unsaturated compound" refers to a compound, such as a monomer and/or oligomer, that contains more than one ethylenically unsaturated group per molecule. As will be appreciated, the presence of a multiethylenically unsaturated compound is necessary in order to form internally crosslinked resin particles, i.e., a microgel. Specific examples of suitable multiethylenically unsaturated monomers include ethylene glycol diacrylate, ethylene glycol dimethacrylate, triethylene glycol dimethacrylate, tetraethylene glycol dimethacrylate, trimethylolpropane triacrylate, trimethylolpropane trimethacrylate, pentaerythritol tetramethylacrylate triallylisocyanurate, diallylphthalate and divinylbenzene. Also suitable are hydrophobic monomers, such as silicone-modified (meth)acrylates, fluorinated (meth)acrylates, and fluorinated ethylenes. Specific examples of such materials include, but are not limited to, Ebecryl™ 350 (silicon diacrylate) and Ebecryl™ 1360 (silicon hexaacrylate) from UCB, Belgium and Silmer® silicone acrylate from Siltech Corporation, Toronto, Ontario, Canada, 1H,1H,6H,6H-perfluoro-1,6-hexanediol diacrylate, and 1H,1H,6H,6H-perfluoro-1,6-hexanediol dimethacrylate, among others.

In certain embodiments, a relatively low level of crosslinking is desired to maintain the particle size of the microgel within a useful range. Therefore, in certain embodiments, the multiethylenically unsaturated compound comprise predominantly a di(meth)acrylate and the di(meth)acrylate is used in relatively minor amounts, as described below. As used in this context, "predominantly" means that greater than 50 percent, in some cases at least 60 percent, at least 70 percent, at least 80 percent, or, in some cases, at least 90 percent of the multiethylenically unsaturated compound is a di(meth)acrylate, based on the total weight of multiethylenically unsaturated compound. As used herein, "(meth)acrylate" and like terms is meant to encompass both acrylates and methacrylates.

In certain embodiments, the multiethylenically unsaturated compound is present in an amount of no more than 5 percent by weight, such as no more than 4 percent by weight, no more than 3 percent by weight, no more than 2.5 percent by weight, or, in some cases, no more than 2 percent by weight, based on the total weight of the reactants used to form the microgel. In certain embodiments, the multiethylenically unsaturated compound is present in an amount of at least 0.1 percent by weight, such as at least 0.5 percent by weight, or, in some cases, at least 1 percent by weight, based on the total weight of the reactants used to form the microgel.

In certain embodiments, the microgel present in the coating compositions of the present invention is the reaction product of reactants comprising a plurality of monoethylenically unsaturated compounds. As used herein, the term "plurality of monoethylenically unsaturated compounds" means that the reactants include two or more compounds, such as monomers and/or oligomers, that contain one ethylenically unsaturated group per molecule.

Moreover, in certain embodiments, the monoethylenically unsaturated compounds are selected so as to provide a copolymer having a calculated glass transition temperature ("Tg") of greater than 100° C., such as at least 105° C. In certain embodiments, the monoethylenically unsaturated compounds are selected so as to provide a copolymer having a calculated Tg of no more than 120° C., such as no more than 115° C., or, in some cases, no more than 110° C. This means that a theoretical copolymer formed from the selected monoethylenically unsaturated monomers, in their selected amounts, has a calculated Tg within the recited range when calculated as described in "The Chemistry of Organic Film Formers," D. H. Solomon, J. Wiley & Sons, New York, 1967, p. 29.

Furthermore, as indicated earlier, among the plurality of monoethylenically unsaturated compounds using to manufacture the microgel present in the coating compositions of the present invention is a cycloaliphatic (meth)acrylate. In certain embodiments, the cycloaliphatic (meth)acrylate has a calculated Tg of at least 95° C., such as at least 100° C. Cycloaliphatic (meth)acrylate monomers include, without limitation, trimethylcyclohexyl acrylate, t-butyl cyclohexyl acrylate, dicyclopentadiene (meth)acrylate, trimethylcyclohexyl methacrylate (calculated Tg of 98° C.), cyclohexyl methacrylate (calculated Tg of 83° C.), isobornyl methacrylate (calculated Tg of 110° C.), 2-ethylhexyl methacrylate, tetrahydrofurfuryl methacrylate, 3,3,5-trimethylcyclohexyl methacrylate (calculated Tg of 125° C.), and/or 4-t-butylcyclohexyl methacrylate, and the like. As used herein, when it is stated that a (meth)acrylate has a calculated Tg of some value, it means that a theoretical homopolymer formed from that (meth)acrylate has a calculated Tg having the recited value when calculated as described in Solomon, supra.

In certain embodiments, the cycloaliphatic (meth)acrylate is used in an amount of up to 30 percent by weight, such as up to 20 percent by weight or up to 15 percent by weight, based on the total weight of monoethylenically unsaturated compounds used to manufacture the microgel used in the coating compositions of the present invention. In certain embodiments, the cycloaliphatic (meth)acrylate is used in an amount of at least 1 percent by weight, such as at least 5 percent by weight or at least 10 percent by weight, based on the total weight of monoethylenically unsaturated compounds used to manufacture the microgel used in the coating compositions of the present invention.

As indicated, other monoethylenically unsaturated monomers are used to manufacture the microgel used in the coating compositions of the present invention. For example, in certain embodiments, the reactants further comprise a vinyl aromatic compound, such as a vinyl aromatic monomer, which, in certain embodiments, comprises a compound that has a calculated Tg of least 100° C. Specific examples of vinyl aromatic compounds are styrene (which has a calculated Tg of 100° C.), α-methylstyrene (which has a calculated Tg of 168° C.), vinyltoluene, p-methylstyrene, ethylvinylbenzene, vinylnaphthalene, vinylxylenes, α-methylstyrene dimer (meth)acrylate, penta fluoro styrene, and the like.

In certain embodiments, the vinyl aromatic compound is used in an amount of up to 40 percent by weight, such as up to 30 percent by weight, based on the total weight of monoethylenically unsaturated compounds used to manufacture the microgel used in the coating compositions of the present invention. In certain embodiments, the vinyl aromatic compound is used in an amount of at least 1 percent by weight, such as at least 10 percent by weight or at least 20 percent by weight, based on the total weight of monoethylenically unsaturated compounds used to manufacture the microgel used in the coating compositions of the present invention.

In certain embodiments, the reactants used to manufacture the microgel used in the coating compositions of the present invention further comprise an alkyl(meth)acrylate, which, in certain embodiments, comprises a compound that has a calculated Tg of least 100° C. Specific examples of alkyl(meth)acrylates are $C_1$-$C_{24}$ alkyl(meth)acrylates, such as methyl (meth)acrylate (which has a calculated Tg of 105° C.), propyl (meth)acrylate, butyl(meth)acrylate, isobutyl(meth)acrylate, hexyl(meth)acrylate, 2-ethylhexyl(meth)acrylate, octyl (meth)acrylate, decyl(meth)acrylate, dodecyl(meth)acrylate, pentadecyl(meth)acrylate, hexadecyl(meth)acrylate, octadecyl(meth)acrylate, and nonadecyl(meth)acrylate, and mixtures thereof.

Other monoethylenically unsaturated compounds suitable for use in manufacturing the microgel present in the coating compositions of the present invention include, for example, nitriles, such as acrylonitrile and/or methacrylonitrile.

In certain embodiments, the alkyl(meth)acrylate is used in an amount of up to 80 percent by weight, such as up to 70 percent by weight, based on the total weight of monoethylenically unsaturated compounds used to manufacture the microgel used in the coating compositions of the present invention. In certain embodiments, the alkyl (meth)acrylate is used in an amount of at least 50 percent by weight, such as at least 60 percent by weight, based on the total weight of monoethylenically unsaturated compounds used to manufacture the microgel used in the coating compositions of the present invention.

In certain embodiments, the microgel used in the coating compositions of the present invention is formed from reactants comprising a plurality of monoethylenically unsaturated monomers, wherein the plurality of monoethylenically unsaturated monomers comprises, or, in some cases, consists essentially of: (a) 10 to 40 percent by weight, such as 20 to 30 percent by weight, based on the total weight of monoethylenically unsaturated monomers, of a vinyl aromatic monomer having a calculated Tg of at least 100° C., such as is the case with styrene; (b) 50 to 80 percent by weight, such as 60 to 70 percent by weight, based on the total weight of monoethylenically unsaturated monomers, of an alkyl (meth)acrylate having a calculated Tg of at least 100° C., such as is the case with methyl methacrylate; and (c) 1 to 40 percent by weight, such as 10 to 20 percent by weight, based on the total weight of monoethylenically unsaturated monomers, of a cycloaliphatic (meth)acrylate having a calculated Tg of at least 95° C., such as is the case with isobornyl methacrylate.

In certain embodiments, the plurality of monoethylenically unsaturated compounds are present in an amount of at least 90 percent by weight, such as at least 95 percent by weight, based on the total weight of the reactants used to form the microgel.

In addition to the foregoing compounds, other reactants may be used to form the microgel present in the coating compositions of the present invention. For example, in certain embodiments, the reactant may further comprise a water soluble ethylenically unsaturated compound. As used herein, the term "water soluble ethylenically unsaturated compound" refers to a compound having a solubility in water of at least 7 weight % at a temperature of 25° C. Examples of water soluble ethylenically unsaturated compounds include ethylenically unsaturated ionic compounds and ethylenically unsaturated water soluble nonionic compounds, such as those described in U.S. Pat. No. 7,091,275 at col. 3, line 64 to col.

5, line 44, the cited portion of which being incorporated herein by reference. In certain embodiments, the water soluble ethylenically unsaturated compound comprises an acid-containing compound, such as a carboxylic acid group containing compound, such as methacrylic acid (which has a calculated Tg of 228° C.) and acrylic acid (which has a calculated Tg of 106° C.), among others.

In certain embodiments, the water soluble ethylenically unsaturated compound is used in an amount of up to 2 percent by weight, based on the total weight of monoethylenically unsaturated compounds used to manufacture the microgel used in the coating compositions of the present invention. In certain embodiments, the water soluble ethylenically unsaturated compound comprises acid groups and is used in an amount sufficient to provide the microgel with 0.01 to 0.1 millequivalents acid per gram of polymer solids.

In certain embodiments, the microgel may comprise functional groups, which are suitable for reacting with an external complementary crosslinking agent (which is an optional component of the coating compositions of the present invention), and which may be incorporated onto the microgel through the use of a reactant comprising an ethylenically unsaturated compound comprising the selected functional group. Complementary reactable groups include, for example: (a) acetoacetate-aldehyde; (b) acetoacetate-amine; c) amine-aldehyde; (d) amine-anhydride; (e) amine-isocyanate; (f) amine-epoxy; (g) aldehyde-hydrazide; (i) acid-epoxy; (j) acid-carbodiimide; (k) acid-chloro methyl ester; (j) acid-chloro methyl amine; (m) acid-anhydride; (n) acid-aziridine; (o) epoxy-mercaptan; and (p) isocyanate-alcohol, among many others.

In certain embodiments, the additional functional group containing ethylenically unsaturated compound comprises an acrylic monomer comprising an aldehyde and/or ketone functional group. Acrylic monomers comprising an aldehyde and/or ketone functional group, as used herein, refers to acrylic monomers comprising at least one group represented by the structure:

wherein R is a monovalent hydrocarbon group and R' is hydrogen or a monovalent hydrocarbon group. Specific examples of suitable such monomers include, but are not limited to, those listed in U.S. Pat. No. 4,786,676 at col. 3, lines 39-56; U.S. Pat. No. 4,959,428 at col. 2, lines 29-56; and U.S. Pat. No. 5,447,970 at col. 2, line 59 to col. 3, line 15, the cited portions of which being incorporated herein by reference. Such monomers can be used singly or in mixtures thereof.

In these embodiments, the external crosslinking agent may comprise at least two functional groups reactive with carbonyl groups, such as any nitrogen-containing compound having at least two amine nitrogens reactive with carbonyl groups. Such crosslinking agents may be aliphatic or aromatic, polymeric or non-polymeric, and may be used singly in a combination of two or more. Non-limiting examples of suitable crosslinking agents include compounds comprising at least two hydrazide, i.e., NH—NH$_2$, groups. Specific examples of such compounds are set forth in U.S. Pat. No. 7,115,682 at col. 10, line 12 to col. 11, line 26, the cited portion of which being incorporated herein by reference. In certain embodiments, the crosslinking agent is present in the composition in an amount such that the amount of functional groups reactive with the carbonyl functionality of the acrylic polymer, for example hydrazide groups, is in the range of 0.02 to 5 equivalents, such as 0.1 to 3 equivalents, or, in some cases, 0.5 to 2 equivalents, per one equivalent of carbonyl group contained in the microgel.

In certain embodiments, the additional functional group containing ethylenically unsaturated compound is used in an amount of up to 3 percent by weight, based on the total weight of monoethylenically unsaturated compounds used to manufacture the microgel used in the coating compositions of the present invention.

In certain embodiments, the reactants used to form the microgel are substantially or, in some cases, completely free of (i) any hydrophobic polymers, such as hydrophobic polyesters, (ii) nitrile functional compounds, (iii) amide functional compounds, and/or (iv) carbamate functional compounds. As used herein, the term "substantially free" means, when used with reference to the substantial absence of a material, that such a material is present, if at all, as an incidental impurity. In other words, the material does not affect the properties of the coating composition. As used herein, the term "completely free" means that a material is not present in the composition at all.

The microgel is often prepared in the form of an emulsion comprising the foregoing microgel in an aqueous continuous phase. The emulsion can be prepared, for example, by latex emulsion polymerization of the polymerizable reactants mentioned above. In certain embodiments, a surface active agent may be added to the aqueous continuous phase to stabilize, or prevent coagulation or agglomeration of the monomer droplets, especially during polymerization.

The surface active agent can be present at any level that stabilizes the emulsion. The surface active agent may be present in an amount of at least 0.001 percent by weight, such as at least 0.005 percent by weight, at least 0.01 percent by weight, or at least 0.05 percent by weight, based on the total weight of the emulsion. The surface active agent may be present in an amount of up to 10 percent by weight, such as up to 7.5 percent by weight, up to 5 percent by weight, or in some cases up to 3 percent by weight based on the total weight of the emulsion. The level of the surface active agent used is determined by the amount required to stabilize the emulsion.

The surface active agent may be an anionic, cationic, reactive or nonionic surfactant, i.e., dispersing agent, or compatible mixtures thereof, such as a mixture of an anionic and a nonionic surfactant. Suitable cationic dispersion agents that may be used include, but are not limited to, lauryl pyridinium chloride, cetyldimethyl amine acetate, and alkyldimethylbenzylammonium chloride, in which the alkyl group has from 8 to 18 carbon atoms.

Suitable anionic dispersing agents include, but are not limited to, alkali fatty alcohol sulfates, such as sodium lauryl sulfate (Duponol C or QC from Du Pont), and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium octylphenoxypolyethoxyethyl sulfate or ammonium nonylphenoxypolyethoxyethyl sulfate, having 1 to 50 oxyethylene units; sodium mixed long chain alcohol sulfates available from Du Pont under the designation Duponol WN, sodium octyl sulfate available from Alcolac, Ltd. under the designation Sipex OLS, sodium tridecyl ether sulfate (Sipex EST), sodium lauryl ether sulfate (Sipon ES), magnesium lauryl sulfate (Sipon LM), the ammonium salt of lauryl sulfate (Sipon L-22), diethanolamino lauryl sulfate (Sipon LD), sodium dodecylbenzene sulfonate (SIPONATE® DS), the sodium laureth sulfate, magnesium laureth sulfate, sodium laureth-8 sulfate, magnesium laureth-8 sulfate mixture sold under the name of Texapon ASV by Cognis; the sodium lauryl ether sulfate ($C_{12-14}$ 70/30) (2.2 EO) sold under the names Sipon AOS 225 or Texapon $N_7O_2$ Paste by Cognis; the ammonium lauryl ether sulphate ($C_{12-14}$ 70/30) (3 EO) sold under the name Sipon Lea 370 by Cognis; and/or the ammonium ($C_{12-14}$) alkyl ether (9 EO) sulfate sold under the name Rhodapex AB/20 by Rhodia Chimie.

Reactive surfactants are suitable for use, often in combination with one or more of the aforementioned anionic surfactants. Examples of such reactive emulsifiers include reactive anionic surfactants, sulfosuccinate reactive anionic surfactants, and alkenyl succinate reactive anionic surfactants. Examples of commercially available sulfosuccinate reactive anionic surfactants are LATEMUL S-120, S-120A, S-180 and S-180A (tradename, products of Kao Corp.) and ELEMINOL JS-2 (tradename, product of Sanyo Chemical Industries, Ltd.). An example of a commercially available alkenyl succinate reactive anionic surfactant is LATEMUL ASK (tradename, product of Kao Corp.). Other suitable reactive surfactants are $C_{3-5}$ aliphatic unsaturated carboxylic acid sulfoalkyl (containing 1 to 4 carbon atoms) ester surfactants, for example, (meth)acrylic acid sulfoalkyl ester salt surfactants such as 2-sulfoethyl(meth)acrylate sodium salt and 3-sulfopropyl(meth)acrylate ammonium salt; and aliphatic unsaturated dicarboxylic acid alkyl sulfoalkyl diester salt surfactants such as sulfopropylmaleic acid alkyl ester sodium salt, sulfopropylmaleic acid polyoxyethylene alkyl ester ammonium salt and sulfoethylfumaric acid polyoxyethylene alkyl ester ammonium salt; maleic acid dipolyethylene glycol ester alkylphenolether sulfates; phthalic acid dihydroxyethyl ester (meth)acrylate sulfates; 1-allyloxy-3-alkyl phenoxy-2-polyoxyethylene sulfates (tradename: ADEKA REASOAP SE-10N, product of ADEKA Corp.), polyoxyethylene alkylalkenylphenol sulfates (tradename: AQUALON, product of DAI-ICHI KOGYO SEIYAKU CO., LTD.), and ADEKA-REASOAP SR-10 (EO number of moles=10, product of ADEKA Corp.), SR-20 (EO number of moles=20, product of ADEKA Corp.), and SR-30 (EO number of moles=30, product of ADEKA Corp.).

Suitable non-ionic surface active agents include but are not limited to alkyl phenoxypolyethoxy ethanols having alkyl groups of from about 7 to 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyacrylic acid, polyvinyl alcohol, and the like, may be used as emulsion stabilizers.

A free radical initiator often is used in the latex emulsion polymerization process. Any suitable free radical initiator may be used. Suitable free radical initiators include, but are not limited to thermal initiators, photoinitiators and oxidation-reduction initiators, all of which may be otherwise categorized as being water-soluble initiators or non-water-soluble initiators.

Examples of thermal initiators include, but are not limited to, azo compounds, peroxides and persulfates. Suitable persulfates include, but are not limited to sodium persulfate and ammonium persulfate. Oxidation-reduction initiators may include, as non-limiting examples persulfate-sulfite systems as well as systems utilizing thermal initiators in combination with appropriate metal ions such as iron or copper.

Suitable azo compounds include, but are not limited to, non-water-soluble azo compounds such as 1-1'-azobiscyclohexanecarbonitrile, 2-2'-azobisisobutyronitrile, 2-2'-azobis (2-methylbutyronitrile), 2-2'azobis(propionitrile), 2-2'-azobis(2,4-dimethylvaleronitrile), 2-2'azobis(valeronitrile), 2-(carbamoylazo)-isobutyronitrile and mixtures thereof; and water-soluble azo compounds such as azobis tertiary alkyl compounds including, but are not limited to, 4-4'-azobis(4-cyanovaleric acid), 2-2'-azobis(2-methylpropionamidine) dihydrochloride, 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis (N,N'-dimethyleneisobutyramidine) dihydrochloride and mixtures thereof.

Suitable peroxides include, but are not limited to hydrogen peroxide, methyl ethyl ketone peroxides, benzoyl peroxides, di-t-butyl peroxides, di-t-amyl peroxides, dicumyl peroxides, diacyl peroxides, decanol peroxide, lauroyl peroxide, peroxydicarbonates, peroxyesters, dialkyl peroxides, hydroperoxides, peroxyketals and mixtures thereof.

The emulsion comprising the microgel described above may also contain a neutralizing agent when the microgel is formed from an ionic reactant, such as the acid functional monomers described above. In such an instance, the neutralizing agent is often a base. Suitable bases include inorganic and organic bases. Suitable inorganic bases include the full range of the hydroxide, carbonate, bicarbonate, and acetate bases of alkali or alkaline metals. Suitable organic bases include ammonia, primary/secondary/tertiary amines, diamines, and triamines. The amount of neutralizing agent required is typically determined on a molar basis of neutralizing agent to polymerized ionic monomer units of the microgel. In certain embodiments, the polymerized ionic monomer units are at least 50%, at least 80%, or, in some cases, at least 90% neutralized.

The Examples herein illustrate suitable conditions for producing the emulsion comprising the microgel described herein, which is typically manufactured by latex polymerization of the polymerizable reactants in an aqueous continuous phase that may include one or more of the aforementioned surface active agents and/or free radical initiators.

In certain embodiments, the latex emulsion of the microgel in an aqueous continuous phase is prepared by a seeded latex emulsion polymerization process. In such a process a portion of the reactants are polymerized using a portion of the free radical initiator to form polymeric seeds dispersed in the continuous phase. Thereafter, the remainder of the initiator is added and the remainder of the reactants is polymerized in the presence of the dispersed polymeric seeds to form the latex emulsion of the microgel. If an ionic reactant was used, a neutralizing agent may then be added to neutralize at least a portion of the ionic groups. Such neutralization can be conducted at elevated temperatures, such as 50-80° C., or it can be conducted after cooling the emulsion to approximately room temperature, i.e., 25-30° C.

The coating compositions of the present invention may comprise other components. In certain embodiments, however, the coating compositions of the present invention are substantially or, in some cases, completely free of any chromium compound.

In certain embodiments, the coating compositions of the present invention also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the coating compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, which is incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating compositions of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in United States Published Patent Application No. 2006-0014099 A1, which is incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

In certain embodiments, the coating composition includes one or more effect pigments, such as metallic pigments such as aluminum flake and copper bronze flake, and micaceous pigments, for example, metal oxide coated mica. A particular advantage of the coating compositions of the present invention is the ability to achieve metallic coatings having good appearance, i.e., a lack of "spotting", when applied at any of a variety of spray application equipment and conditions. Without being bound by any theory, it is currently believed that the microgel, which serves as the primary or, in some case, essentially the sole polymeric binder component of the coating composition, has thixotropic properties that promotes atomization of the composition at a wide variety of conditions while also promoting flake orientation in the deposited coating film. The level of effect pigments present in the compositions of the present invention can vary dependent upon the other composition components, the desired color, and/or the end use of substrate to be coated.

The coating compositions of the present invention may further contain other optional ingredients such as organic solvents, antifoaming agents, pigment dispersing agents, plasticizers, ultraviolet absorbers, antioxidants, surfactants and the like. These optional ingredients when present are often present in amounts up to 30 percent, typically 0.1 to 20 percent by weight based on total weight of the coating composition.

The coating compositions of the present invention can be produced by any method well known to those of ordinary skill in the art using the above components as raw materials. In some cases, a latex emulsion comprising the microgel, as described above, is combined with the other coating components, such as colorants, rheology modifiers, diluents, and the like, under suitable agitation. Suitable methods are described in the Examples herein.

The present invention also relates to methods of using the foregoing coating compositions. These methods comprise applying the coating composition to the surface of a substrate or article to be coated, allowing the composition to coalesce to form a substantially continuous film and then allowing the film to cure.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminum tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminum derivatives, quebracho, chestnut or mimosa extracts, aromatic syntans, polyurethanes, (co) polymers of (meth) acrylic acid compounds or melamine, dicyanodiamide and/or urea/formaldehyde resins.

In certain embodiments, the coating compositions of the present invention are suitable for application to "flexible" substrates. As used herein, the term "flexible substrate" refers to a substrate that can undergo mechanical stresses, such as bending or stretching and the like, without significant irreversible change. In certain embodiments, the flexible substrates are compressible substrates. "Compressible substrate" and like terms refer to a substrate capable of undergoing a compressive deformation and returning to substantially the same shape once the compressive deformation has ceased. The term "compressive deformation" and like terms mean a mechanical stress that reduces the volume at least temporarily of a substrate in at least one direction. Examples of flexible substrates includes non-rigid substrates, such as woven and nonwoven fiberglass, woven and nonwoven glass, woven and nonwoven polyester, thermoplastic urethane (TPU), synthetic leather, natural leather, finished natural leather, finished synthetic leather, foam, polymeric bladders filled with air, liquid, and/or plasma, urethane elastomers, synthetic textiles and natural textiles. Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include but are not limited to polystyrene foams, polyvinyl acetate and/or copolymers, polyvinyl chloride and/or copolymers, poly(meth)acrylimide foams, polyvinylchloride foams, polyurethane foams, and polyolefinic foams and polyolefin blends. Polyolefinic foams include but are not limited to polypropylene foams, polyethylene foams and ethylene vinyl acetate ("EVA") foams. EVA foam can include flat sheets or slabs or molded EVA foams, such as shoe midsoles. Different types of EVA foam can have different types of surface porosity. Molded EVA can comprise a dense surface or "skin", whereas flat sheets or slabs can exhibit a porous surface. "Textiles" can include natural and/or synthetic textiles such as fabric, vinyl and urethane coated fabrics, mesh, netting, cord, yarn and the like, and can be comprised, for example, of canvas, cotton, polyester, KELVAR, polymer fibers, polyamides such as nylons and the like, polyesters such as polyethylene terephthalate and polybutylene terephthalate and the like, polyolefins such as polyethylene and polypropylene and the like, rayon, polyvinyl polymers such as polyacrylonitrile and the like, other fiber materials, cellulosics materials and the like.

The coating compositions of the present invention can be applied to such substrates by any of a variety of methods including spraying, brushing, dipping, and roll coating, among other methods. In certain embodiments, however, the coating compositions of the present invention are applied by spraying and, accordingly, such compositions often have a viscosity that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. The coating compositions of the present invention may be colored or clear, and may be used alone or in combination as a primer, basecoat, or topcoat.

The coating compositions of the present invention can, in at least some cases, find particular application in the consumer electronics market. As a result, the present invention is also directed to a consumer electronics device, such as a cell phone, personal digital assistant, smart phone, personal computer, digital camera, or the like, which is at least partially coated with a coating deposited from a coating composition of the present invention.

Illustrating the invention are the following examples that are not to be considered as limiting the invention to their details. All parts and percentages in the examples, as well as throughout the specification, are by weight unless otherwise indicated.

Example 1

A latex emulsion of a microgel was made using the ingredients listed in Table 1.

TABLE 1

| Ingredients | Parts by Weight |
|---|---|
| Charge #1 | |
| DI Water | 398.0 |
| Rhodapex AB/20[1] | 20.69 |
| Charge #2 | |
| DI Water | 300 |
| Adeka Reasoap SR10[2] | 6.0 |
| Rhodapex AB/20[1] | 13.79 |
| Triton N101[3] | 6.0 |
| Styrene | 132 |
| Methyl Methacrylate | 349.13 |
| Isobornyl Methacrylate | 57.50 |
| Ethylene glycol Dimethacrylate | 11.4 |
| Methacrylic Acid | 9.6 |
| Ethyl Carbitol[4] | 100 |
| Charge #3 | |
| DI Water | 8.56 |
| Ammonium Peroxydisulfate | 1.86 |
| Charge #4 | |
| Part of Charge #2 | 22.7 |
| Charge #5 | |
| DI Water | 10.0 |

TABLE 1-continued

| Ingredients | Parts by Weight |
|---|---|
| Charge #6 | |
| Dimethylethanolamine (DMEA) | 3.87 |
| Charge #7 | |
| DI Water | 20.0 |

[1]Rhodapex AB/20 is from Rhodia.
[2]Adeka Reasoap SR10 is from Adeka Corporation.
[3]Triton N101 is from Dow Chemical Co.
[4]Ethylcarbitol (diethyleneglycol mononethyl ether) is from Dow Chemical Co.

Charge #1 was added to a 2-liter, 4-necked flask equipped with a motor driven stainless steel stir blade, a water-cooled condenser, a nitrogen inlet, and a heating mantle with a thermometer connected through a temperature feedback control device. The contents of the flask were heated to 80° C. and held at that temperature for about 15 minutes for temperature stabilization. During this hold, Charge #2 and Charge #3 were premixed over 30 minutes. Then added Charge #4 over 5 minutes and held at 80° C. for additional 5 minutes. Charge #3 was added over 5 minutes and held for 30 minutes. After the hold, Charge #2 remainder was added over 180 minutes. Charge #5 was used as a rinse for Charge #2. After the completion of Charge #5, the reaction was held for 60 minutes at 80° C. The batch was cooled to 50-60° C. and added Charge #6 for 5 minutes. Charge #7 was used as rinse for Charge #6. After 60 minutes at 50-60° C. to contents were cooled to room temperature. A sample of the acrylic latex was placed in a 120° F. hot room for 4 weeks, and the resin remained as emulsion. The acrylic microgel had a mean particle size of 115 nanometers measured using a Zetasizer 9000HS at 25° C. as described above.

Examples 2-5

Latex emulsions of a microgel with varying glass transition temperatures and internal cross-linking were made using the process described in Example 1. The compositions of the resins (solid weight %) and the final resin characterization are shown in Table 2.

TABLE 2

| Ingredient | Example 2 | Example 3 (Comparative) | Example 4 (Comparative) | Examples 5 (Comparative) |
|---|---|---|---|---|
| Monomer Composition (%) | | | | |
| Methacrylic Acid | 1.73 | 1.72 | 1.73 | 1.73 |
| Methylmethacrylate | 62.4 | 72.7 | 60.1 | 56.1 |
| 2-Ethylhexylacrylate | 0 | 0 | 2.33 | 6.33 |
| Styrene | 23.4 | 23.6 | 23.6 | 23.6 |
| Isobornyl Methacrylate | 10.3 | 0 | 10.3 | 10.3 |
| Ethyleneglycol Dimethacrylate | 2.03 | 2.03 | 2.03 | 2.03 |
| Characterization | | | | |
| Solids %[1] | 42 | 51 | 42 | 41 |
| pH | 8.86 | 7.9 | 7.42 | 8.13 |
| Theory Tg in ° C. | 106 | 105 | 100 | 90 |
| Mean Particle Size (nanometers)[2] | 115 | NA | 114 | 115 |

[1]Solids content measured for 1 hour at 110° C.
[2]Mean Particle size was measured using a Zetasizer 9000HS at 25° C. as described above.

Examples 6-9

Coating compositions were prepared using the ingredients and amounts listed in Table 3. Amounts are in grams.

TABLE 3

| Ingredient | Example 6 | Example 7 (Comparative) | Example 8 (Comparative) | Example 9 (Comparative) |
|---|---|---|---|---|
| Latex emulsion of 2 | 229.35 | — | — | — |
| Latex emulsion of 3 | — | 185.09 | — | — |
| Latex emulsion of 4 | — | — | 224.71 | — |
| Latex emulsion of 5 | — | — | — | 224.71 |
| Dowanol DPM[1] | 12.34 | 8.33 | 12.34 | 12.34 |
| Dowanol DPnP[2] | 10.3 | 5.95 | 10.3 | 10.3 |
| DI Water | 50 | 44.03 | 50 | 50 |
| Latekoll D rheology modifier[3] | 7.75 | 5.08 | 7.75 | 7.75 |
| DI Water | 31.41 | 20.33 | 31.41 | 31.41 |
| DMEA Amine | 1.45 | 1.33 | 1.45 | 1.45 |
| DI Water | 18.47 | 12.00 | 18.47 | 18.47 |
| SSP-751 aluminum flake[4] | 0 | 28.33 | 0 | 0 |
| Stapa BG Hydrolan 2192 aluminum[5] | 36.06 | 0 | 34.82 | 34.82 |
| Phosphonated aluminum passivator | 9.78 | 10.13 | 9.78 | 9.78 |
| Dowanol DPM[1] | 11.69 | 18.81 | 11.69 | 11.69 |
| Dowanol DPnP[2] | 6 | 4.70 | 6 | 6 |
| Butyl Cellosolve[6] | 5 | 0 | 5 | 5 |
| Laponite RD rheology modifier[7] | 1.46 | 1.51 | 1.46 | 1.46 |
| DI Water | 71.48 | 74.00 | 71.48 | 71.48 |
| Total | 502.56 | 497.16 | 496.67 | 496.67 |

[1]Dipropylene Glycol Methyl Ether commercially available from Dow Chemical Company
[2]Dipropylene Glycol n-Propyl Ether commercially available from Dow Chemical Company
[3]Rheology modifier commercially available from BASF Corporation
[4]Aluminum pigment commercially available from Silberline Manufacturing Co., Inc.
[5]Aluminum paste commercially available from Eckart America Corporation.
[6]Commercially available from Dow Chemical Company
[7]Colloidal clay rheology modifier commercially available from Southern Clay Products.

Each of the coating compositions of Examples 6-9 was prepared for testing in the following manner. The compositions were spray applied on PC-ABS (polycarbonate and acrylonitrile-butadiene-styrene composite) substrates MC 8002-701 purchased from Standard Plaque Inc. A five minute flash time was allowed before an oven cure of 4 hours at 140° F. Film thickness are reported in Table 4.

Cured films were evaluated for chemical, stain, oleic acid, hot water resistance, humidity resistance, and abrasion resistance. Results are set forth in Table 4.

TABLE 4

| Test | Example 6 | Example 7 | Example 8 | Example 9 |
|---|---|---|---|---|
| Film Thickness (mils) | 0.6 | 0.8 | 0.61 | 0.52 |
| Chemical Resistance[1] | | | | |
| 50 MEK Double Rubs | 50 | 50 | 35 | 28 |
| 50 ETOH Double Rubs | 50, no mark | 50, no mark | 50, no mark | 50, slight mar |
| 50 IPA Double Rubs: 70% IPA | 50, no mark | 50, no mark | 50, no mark | 50, no mark |
| Stain Resistance[2] | | | | |
| Lactic Acid | 5 | 5 | 5 | 5 |
| Ethanol Resistance | 5 | 5 | 5 | 5 |
| Insect Repellant | 4 | 3 | 3 | 3 |
| Oleic Acid[3] | No mark, pass ΔE = 0.879 | No mark, pass ΔE = 0.870 | Some spots, fail ΔE = 2.281 | Soften, spots, fail ΔE = 3.460 |
| Hot Water Bath[4] | No blisters, no whitening, good appearance | No blisters, no whitening, good appearance | Slight whitening | Whitening |
| Humidity Resistance[5] | | | | |
| Initial: Face Brightness - L15 | 134.09 | 118 | 135.59 | 135.10 |
| Initial: Flop - Flop Index | 11.81 | 10.6 | 12.26 | 12.32 |
| Final: Face Brightness - L15 | 136.87 | 120 | 137.58 | 136.95 |

TABLE 4-continued

| Test | Example 6 | Example 7 | Example 8 | Example 9 |
|---|---|---|---|---|
| Final: Flop - Flop Index | 12.27 | 8.8 | 12.95 | 12.45 |
| Crosshatch Adhesion | 5B | 5B | 5B | 5B |
| Abrasion Resistance[6] | 0.66 | 0.15 | — | — |

[1]Chemical resistance was tested by immersing a Q-tip into the test solution and rubbing the film surface back and forth 50 times. If the substrate became visible at less than 50 double rubs, then the number of rubs was recorded. Otherwise, the surface was inspected after 50 rubs and evaluated for mar.
[2]Stain resistance was performed by placing a drop of test solution on the film surface and leaving it uncovered for 24 hours. After 24 hours, the remaining test solution was removed from the surface by cleaning with water. The spot was evaluated on a 1 to 5 scale, where 1 represents paint being removed from substrate and 5 represents no mark.
[3]The oleic acid test was performed by soaking the cured film surface with oleic acid and placing the soaked panels horizontally in a humidity chamber at 100% humidity and 100° F. After 8 hours of humidity exposure, the panels were taken out and washed with soap and water to remove the oleic acid. The general appearance such as spotting was visually assessed. Also, the color change from the original was recorded with a Hunter Lab color eye. The films were checked for softening with a finger nail.
[4]Hot water bath testing was performed by immersing coated PC-ABS panels in water and expose them to 185° F. for one hour. Face brightness and flop index were measured with a BYK-mac instrument manufactured by BYK-Gardner.
[5]The humidity test consisted of exposing the coated panels to a humidity chamber set up at 100° F. and 100% relative humidity for 7 days. Face brightness and flop index were measured with a BYK-mac instrument manufactured by BYK-Gardner. Adhesion after humidity was measured using a test method ASTM D3359 with a paint adhesion test kit commercially available from Paul N. Gardner Company, Inc. The film was scribed with a cross-hatch pattern and an adhesive tape was applied to the scribed area. The tape was then removed and the area was evaluated on a 0B to 5B scale where 0B represents total paint delamination from the substrate and 5B means no paint has been removed.
[6]Taber abrasion test was performed consistent with the ASTM D4060. CS-17 abrasion wheels were used with a total loading weight of 1000 g on a 4" × 4" flat plaque. The number of cycles to remove the paint and reach the substrate were recorded. Weight loss (mg) per cycle is reported (lower value is better abrasion resistance).

Examples 10-14

Latex emulsions of a microgel with various glass transition temperatures and internal cross-linking were made using the process described in Example 1. Table 5 shows the compositions of the resins (solid weight %) and the final resin characterization.

TABLE 5

| Example | 10 | 11 | 12 | 13 | 14 |
|---|---|---|---|---|---|
| Monomer Composition (%) | | | | | |
| Methacrylic Acid | 1.73 | 1.73 | 1.73 | 1.73 | 1.73 |
| Methylmethacrylate | 62.4 | 62.4 | 62.4 | 62.4 | 62.4 |
| 2-Ethylhexylacrylate | 0 | 0 | 0 | 0 | 0 |
| Alpha-methyl Styrene | 0 | 0 | 7 | 12.9 | 18.9 |
| Styrene | 23.4 | 23.4 | 16.6 | 10.6 | 4.6 |
| Trimethylcyclohexyl Methacrylate | 10.3 | 0 | 0 | 0 | 0 |
| Cyclohexyl Methacrylate | 0 | 10.3 | 0 | 0 | 0 |
| Isobornyl Methacrylate | 0 | 0 | 10.3 | 10.3 | 10.3 |
| Ethyleneglycol Dimethacrylate | 2.03 | 2.03 | 2.03 | 2.03 | 2.03 |
| Characterization | | | | | |
| Solids %[1] | 42 | 41 | 41 | 41 | 40 |
| pH | 8.2 | 8.3 | 8.3 | 8.4 | NA |
| Theory Tg in ° C. | 105 | 103 | 110 | 114 | 118 |
| Particle Size (nanometers)[2] | 122 | 122 | 118 | 186 | 127 |

[1]Solids content measured for 1 hour at 110° C.
[2]Particle size was measure using Zetasizer 9000HS at 25° C.

Examples 15-19

Coating compositions were prepared using the ingredients and amounts listed in Table 6. Amounts are in grams.

TABLE 6

| Ingredient | Example 15 | Example 16 | Example 17 | Example 18 | Example 19 |
|---|---|---|---|---|---|
| Latex emulsion of Example 10 | 223.05 | — | — | — | — |
| Latex emulsion of Example 11 | — | 223.05 | — | — | — |
| Latex emulsion of Example 12 | — | — | 223.05 | — | — |
| Latex emulsion of Example 13 | — | — | — | 223.05 | — |
| Latex emulsion of Example 14 | — | — | — | — | 223.05 |
| Dowanol DPM[1] | 15.15 | 15.15 | 15.15 | 15.15 | 15.15 |
| Dowanol DPnP[2] | 10.10 | 10.10 | 10.10 | 10.10 | 10.10 |
| DI Water | 25.00 | 25.00 | 25.00 | 25.00 | 25.00 |
| Latekoll D rheology modifier[3] | 3.46 | 3.46 | 3.46 | 3.46 | 3.46 |
| DI Water | 24.78 | 24.78 | 24.78 | 24.78 | 24.78 |
| DMEA Amine | 0.99 | 0.99 | 0.99 | 0.99 | 0.99 |
| DI Water | 14.58 | 14.58 | 14.58 | 14.58 | 14.58 |
| SSP-751 aluminum flake[4] | — | — | — | — | — |
| Stapa BG Hydrolan 2192 aluminum[5] | 39.20 | 39.20 | 39.20 | 39.20 | 39.20 |
| Phosphonated aluminum passivator | 7.72 | 7.72 | 7.72 | 7.72 | 7.72 |
| Dowanol DPM[1] | 10.11 | 10.11 | 10.11 | 10.11 | 10.11 |
| Dowanol DPnP[2] | 5.05 | 5.05 | 5.05 | 5.05 | 5.05 |

TABLE 6-continued

| Ingredient | Example 15 | Example 16 | Example 17 | Example 18 | Example 19 |
|---|---|---|---|---|---|
| Butyl Cellosolve[6] | 5.05 | 5.05 | 5.05 | 5.05 | 5.05 |
| Laponite RD rheology modifier[7] | 1.01 | 1.01 | 1.01 | 1.01 | 1.01 |
| DI Water | 50.50 | 50.50 | 50.50 | 50.50 | 50.50 |
| Total | 435.75 | 435.75 | 435.75 | 435.75 | 435.75 |

[1]Dipropylene Glycol Methyl Ether commercially available from Dow Chemical Company
[2]Dipropylene Glycol n-Propyl Ether commercially available from Dow Chemical Company
[3]Rheology modifier commercially available from BASF Corporation
[4]Aluminum pigment commercially available from Silberline Manufacturing Co., Inc.
[5]Aluminum paste commercially available from Eckart America Corporation.
[6]Commercially available from Dow Chemical Company
[7]Colloidal clay rheology modifier commercially available from Southern Clay Products.

Each of the coating compositions of Examples 15-19 was prepared for testing in the following manner. The compositions were spray applied on PC-ABS (polycarbonate and acrylonitrile-butadiene-styrene composite) substrates MC 8002-701 purchased from Standard Plaque Inc. A five minute flash time was allowed before an oven cure of 4 hours at 140° F. Film thicknesses are reported in Table 7.

Cured films were evaluated for chemical, stain, oleic acid, hot water resistance, humidity resistance, and abrasion resistance. Results are set forth in Table 7.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition comprising:
   (a) a continuous phase comprising water; and

TABLE 7

| Test | Example 15 | Example 16 | Example 17 | Example 18 | Example 19 |
|---|---|---|---|---|---|
| Film Thickness (mils) | 0.5 | 0.7 | 0.7 | 0.6 | 0.6 |
| Chemical Resistance[1] | | | | | |
| 50 MEK Double Rubs | 50 | 50 | 50+ | 50+ | 50++ |
| 50 ETOH Double Rubs | 50, no mark | 50, no mark | 50, no mark | 50, no mark | 50, no mark |
| 50 IPA Double Rubs: 70% IPA | 50, no mark | 50, no mark | 50, no mark | 50, no mark | 50, no mark |
| Stain Resistance[2] | | | | | |
| Lactic Acid | 5 | 5 | 5 | 5 | 5 |
| Ethanol Resistance | 5 | 5 | 5 | 5 | 5 |
| Insect Repellant | 3 | 3 | 4 | 4 | 4-5 |
| Oleic Acid[3] | No mark, pass $\Delta E = 0.64$ | No mark, pass $\Delta E = 0.28$ | No mark, pass $\Delta E = 0.41$ | No mark, pass $\Delta E = 0.69$ | No mark, pass $\Delta E = 0.49$ |
| Hot Water Bath[4] | No blisters, no whitening, good appearance | No blisters, no whitening, good appearance | No blisters, no whitening, good appearance | No blisters, no whitening, good appearance | No blisters, no whitening, good appearance |
| Humidity Resistance[5] | | | | | |
| Initial: Face Brightness - L15 | 123.5 | 122 | 117.6 | 119.7 | 120.1 |
| Initial: Flop - Flop Index | 9.5 | 9.2 | 8.2 | 8.5 | 8.3 |
| Final: Face Brightness - L15 | 125.7 | 127.2 | 122.6 | 121.6 | 122.6 |
| Final: Flop - Flop Index | 9.7 | 10 | 9 | 8.6 | 9 |
| Crosshatch Adhesion | 5B | 5B | 5B | 5B | 5B |
| Abrasion Resistance[6] | 0.055 | 0.055 | 0.064 | 0.071 | 0.077 |

[1]Chemical resistance was tested by immersing a Q-tip into the test solution and rubbing the film surface back and forth 50 times. If the substrate became visible at less than 50 double rubs, then the number of rubs was recorded. Otherwise, the surface was inspected after 50 rubs and evaluated for mar.
[2]Stain resistance was performed by placing a drop of test solution on the film surface and leaving it uncovered for 24 hours. After 24 hours, the remaining test solution was removed from the surface by cleaning with water. The spot was evaluated on a 1 to 5 scale, where 1 represents paint being removed from substrate and 5 represents no mark.
[3]The oleic acid test was performed by soaking the cured film surface with oleic acid and placing the soaked panels horizontally in a humidity chamber at 100% humidity and 100° F. After 8 hours of humidity exposure, the panels were taken out and washed with soap and water to remove the oleic acid. The general appearance such as spotting was visually assessed. Also, the color change from the original was recorded with a Hunter Lab color eye. The films were checked for softening with a finger nail.
[4]Hot water bath testing was performed by immersing coated PC-ABS panels in water and expose them to 185° F. for one hour. Face brightness and flop index were measured with a BYK-mac instrument manufactured by BYK-Gardner.
[5]The humidity test consisted of exposing the coated panels to a humidity chamber set up at 100° F. and 100% relative humidity for 7 days. Face brightness and flop index were measured with a BYK-mac instrument manufactured by BYK-Gardner. Adhesion after humidity was measured using a test method ASTM D3359 with a paint adhesion test kit commercially available from Paul N. Gardner Company, Inc. The film was scribed with a cross-hatch pattern and an adhesive tape was applied to the scribed area. The tape was then removed and the area was evaluated on a 0B to 5B scale where 0B represents total paint delamination from the substrate and 5B means no paint has been removed.
[6]Taber abrasion test was performed consistent with the ASTM D4060. CS-17 abrasion wheels were used with a total loading weight of 1000 g on a 4" × 4" flat plaque. The number of cycles to remove the paint and reach the substrate were recorded. Weight loss (mg) per cycle is reported (lower value is better abrasion resistance).

(b) a dispersed phase comprising a microgel having a mean particle size of greater than 50 nanometers to 900 nanometers and formed from reactants comprising:
  (i) no more than 5 percent by weight, based on the total weight of the reactants, of a multiethylenically unsaturated compound, and
  (ii) a plurality of monoethylenically unsaturated compounds selected so as to provide a copolymer having a calculated Tg of greater than 100° C. and comprising a cycloaliphatic (meth)acrylate.

2. The coating composition of claim 1, wherein the microgel has a mean particle size of 80 to 500 nanometers.

3. The coating composition of claim 1, wherein the microgel is present in an amount of at least 50 percent by weight, based on the total weight of resin solids in the coating composition.

4. The coating composition of claim 3, wherein the microgel is present in an amount of at least 90 percent by weight, based on the total weight of resin solids in the coating composition.

5. The coating composition of claim 1, wherein the calculated Tg is from greater than 100° C. to 120° C.

6. The coating composition of claim 1, wherein the plurality of monoethylenically unsaturated compounds further comprise a vinyl aromatic monomer having a Tg of at least 100° C. and an alkyl(meth)acrylate having a Tg of at least 100° C.

7. The coating composition of claim 6, wherein the plurality of monoethylenically unsaturated compounds comprise:
  (a) 10-40 percent by weight, based on the total weight of monoethylenically unsaturated compounds, of a vinyl aromatic monomer having a Tg of at least 100° C.,
  (b) 50-80 percent by weight, based on the total weight of monoethylenically unsaturated compounds, of an alkyl (meth)acrylate having a Tg of at least 100° C., and
  (c) 1-20 percent by weight, based on the total weight of monoethylenically unsaturated compounds, of a cycloaliphatic (meth)acrylate having a Tg of at least 95° C.

8. The coating composition of claim 1, wherein the plurality of monoethylenically unsaturated compounds is present in an amount of at least 90 percent by weight, based on the total weight of the reactants used to make the microgel.

9. The coating composition of claim 7, wherein the reactants further comprise:
  (iii) up to 2 percent by weight, based on the total weight of the reactants, of a water soluble ethylenically unsaturated monomer.

10. The coating composition of claim 7, wherein the reactants further comprise:
  (iv) up to 3 percent by weight, based on the total weight of the reactants, of an additional functional group containing ethylenically unsaturated monomer.

11. A waterborne coating composition comprising:
  (a) a continuous phase comprising water; and
  (b) a dispersed phase comprising a microgel comprising the reaction product of reactants comprising:
    (i) a multiethylenically unsaturated monomer, and
    (ii) a plurality of monoethylenically unsaturated monomers selected so as to provide a copolymer having a calculated Tg of greater than 100° C. and comprising a cycloaliphatic (meth)acrylate, wherein
  the microgel has a mean particle size of greater than 50 nanometers to 900 nanometers and is present in the coating composition in an amount of at least 50 percent by weight, based on the total weight of resin solids in the composition.

12. The coating composition of claim 11, wherein the microgel has a mean particle size of 80 to 500 nanometers.

13. The coating composition of claim 11, wherein the microgel is present in an amount of at least 90 percent by weight, based on the total weight of resin solids in the coating composition.

14. The coating composition of claim 11, wherein the calculated Tg is from greater than 100° C. to 120° C.

15. The coating composition of claim 11, wherein the plurality of monoethylenically unsaturated compounds further comprise a vinyl aromatic monomer having a Tg of at least 100° C. and an alkyl(meth)acrylate having a Tg of at least 100° C.

16. The coating composition of claim 11, wherein the plurality of monoethylenically unsaturated compounds comprise:
  (a) 10-40 percent by weight, based on the total weight of monoethylenically unsaturated compounds, of a vinyl aromatic monomer having a Tg of at least 100° C.,
  (b) 50-80 percent by weight, based on the total weight of monoethylenically unsaturated compounds, of an alkyl (meth)acrylate having a Tg of at least 100° C., and
  (c) 1-20 percent by weight, based on the total weight of monoethylenically unsaturated compounds, of a cycloaliphatic (meth)acrylate having a Tg of at least 95° C.

17. The coating composition of claim 11, wherein the plurality of monoethylenically unsaturated compounds is present in an amount of at least 90 percent by weight, based on the total weight of the reactants used to make the microgel.

18. The coating composition of claim 16, wherein the reactants further comprise:
  (iii) up to 2 percent by weight, based on the total weight of the reactants, of a water soluble ethylenically unsaturated monomer.

19. The coating composition of claim 16, wherein the reactants further comprise:
  (iv) up to 3 percent by weight, based on the total weight of the reactants, of an additional functional group containing ethylenically unsaturated monomer.

* * * * *